United States Patent [19]

Albin

[11] 4,374,801
[45] Feb. 22, 1983

[54] METHOD OF HANDLING FUEL ASSEMBLIES AND RODS WHEN RELOADING A NUCLEAR REACTOR

[75] Inventor: Michel Albin, Vaucresson, France

[73] Assignee: Framatome, Courbevoie, France

[21] Appl. No.: 163,207

[22] Filed: Jun. 25, 1980

[30] Foreign Application Priority Data

Jun. 26, 1979 [FR] France ................ 79 16349

[51] Int. Cl.³ .................................... G21C 19/00
[52] U.S. Cl. ................................ 376/264; 376/268; 376/270; 376/271; 294/86 A; 414/146
[58] Field of Search .................. 176/30; 376/264, 268, 376/270, 271; 414/146; 294/86 A

[56] References Cited

U.S. PATENT DOCUMENTS

| | | | |
|---|---|---|---|
| 3,637,096 | 12/1972 | Crate | 176/30 |
| 3,677,328 | 7/1972 | Buzzi | 176/30 |
| 3,935,062 | 1/1976 | Keller | 176/30 |
| 3,952,885 | 4/1976 | Schabert | 176/30 |
| 4,053,067 | 10/1977 | Katz | 176/30 |
| 4,056,435 | 11/1977 | Carlier | 176/30 |
| 4,069,098 | 1/1978 | Wade | 176/30 |
| 4,096,031 | 6/1978 | Wade | 176/30 |

*Primary Examiner*—Donald P. Walsh
*Attorney, Agent, or Firm*—Pollock, Vande Sande & Priddy

[57] ABSTRACT

A nuclear reactor containing assemblies having two caps and a framework inside which fuel rods are disposed vertically is reloaded by first inverting the assembly to be removed into a vertical position permitting the then lower cap to be demounted. The spent fuel rods are then identified and removed in sets and deposited in a suitable storage area, and replacement rods are placed in sets in the framework of the fuel assembly. Finally, the lower cap is replaced and the assembly is conveyed into the reactor vessel at its new location.

8 Claims, 10 Drawing Figures

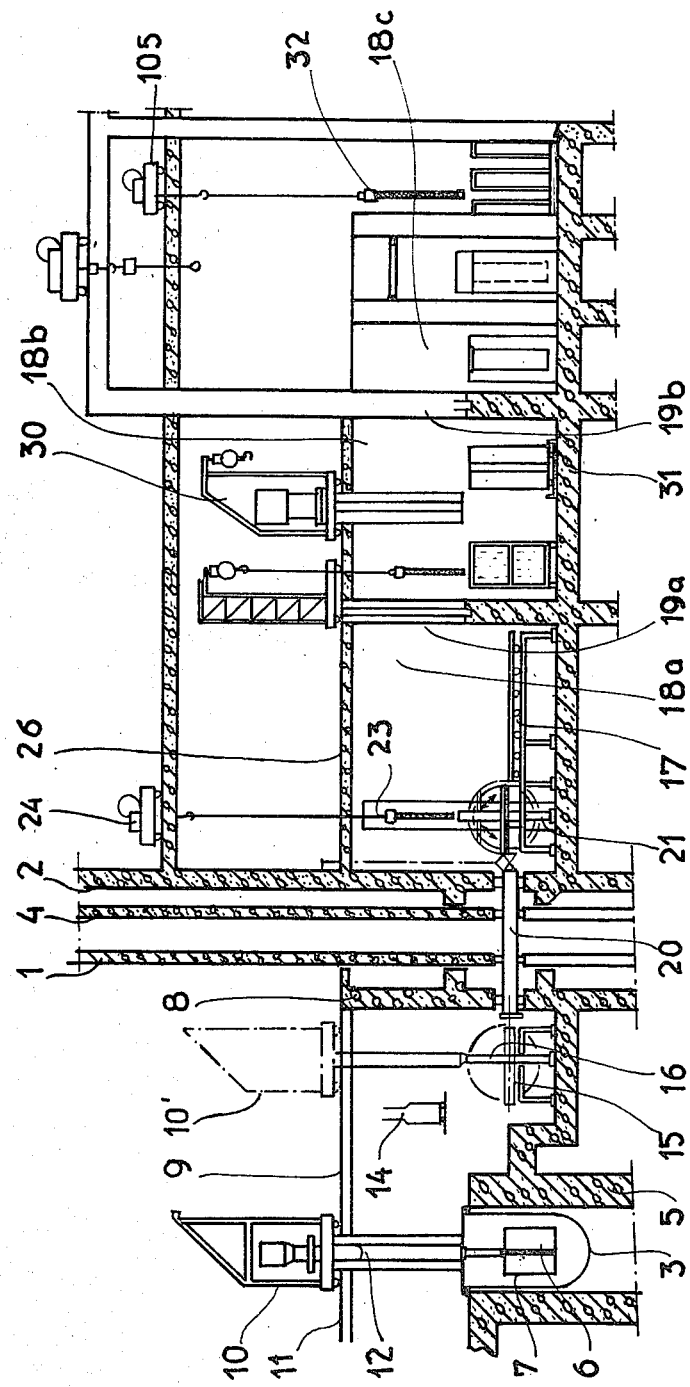

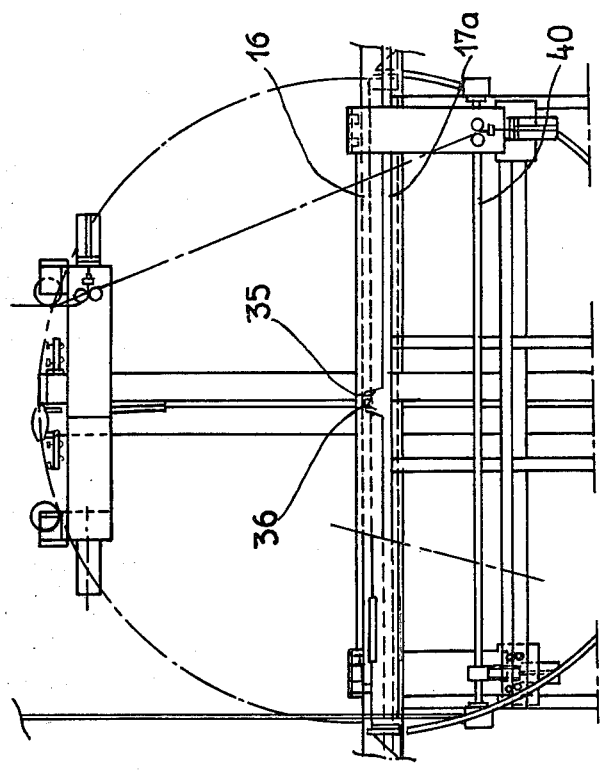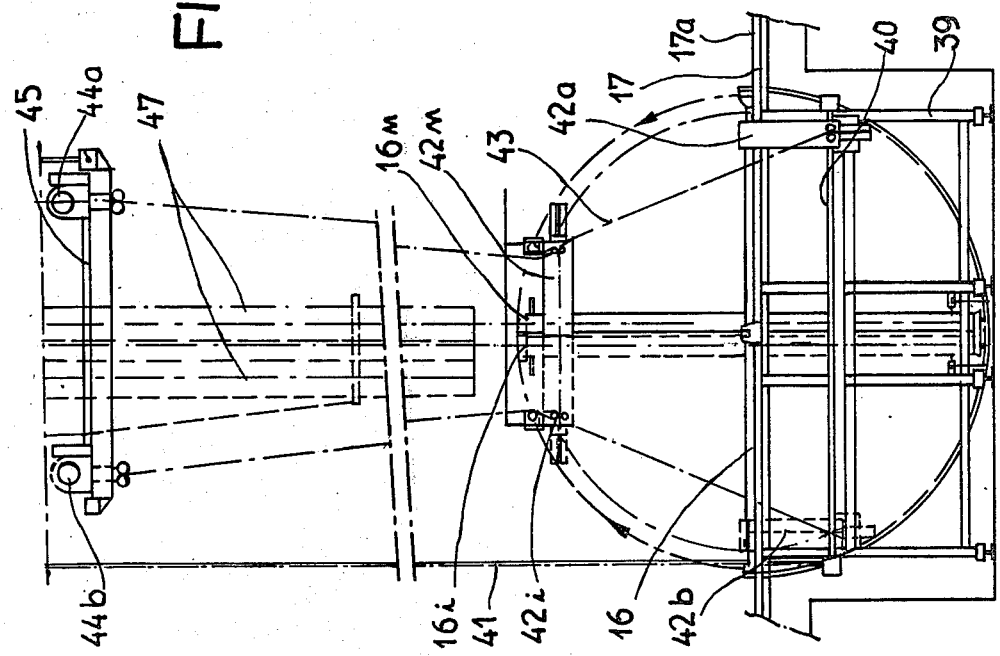

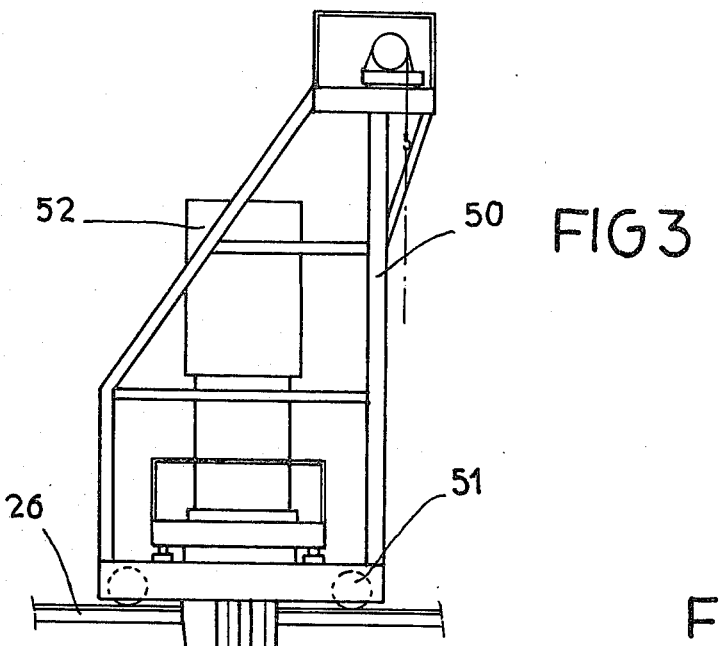
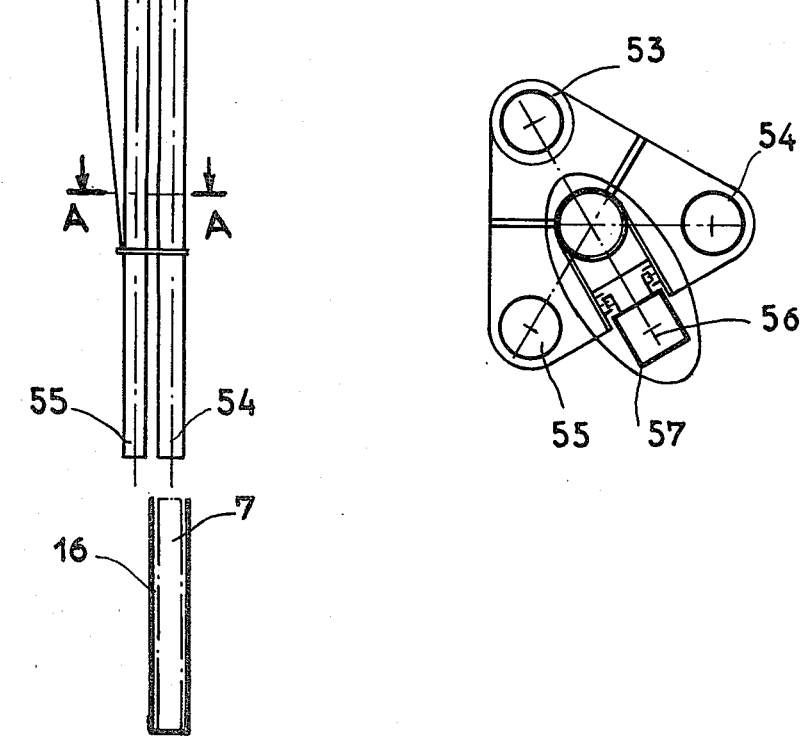

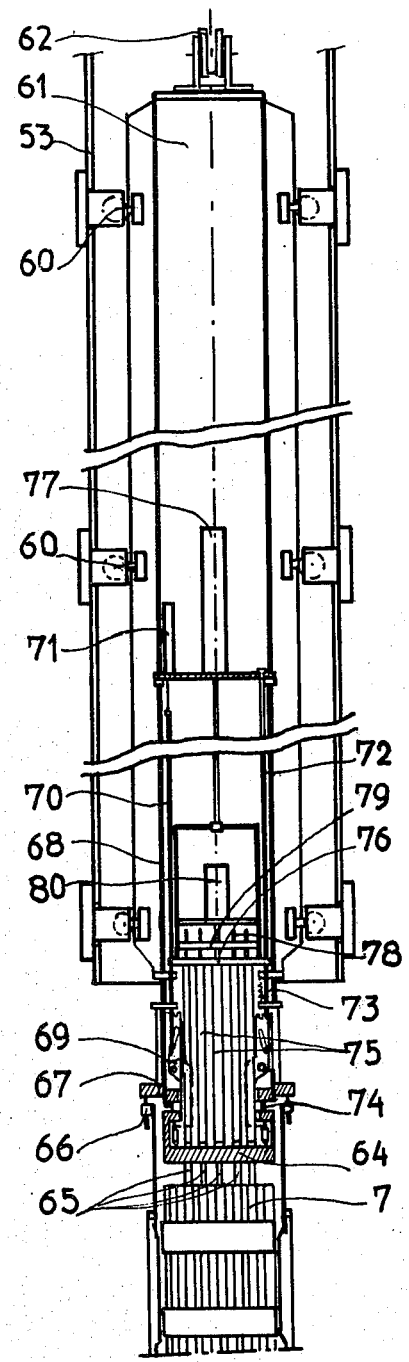
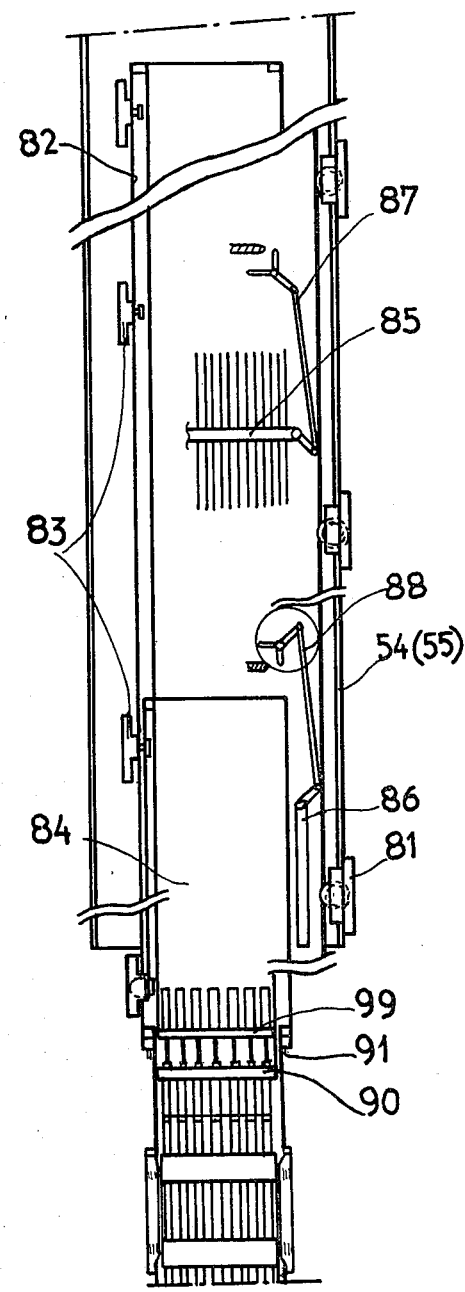

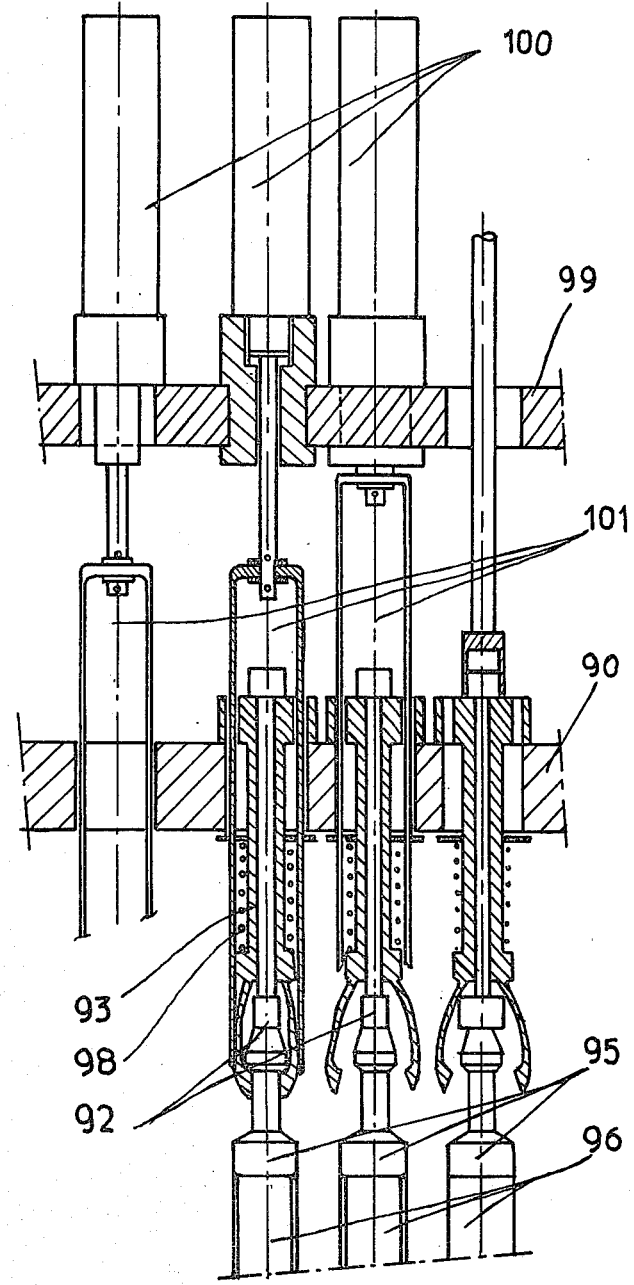

4,374,801

METHOD OF HANDLING FUEL ASSEMBLIES AND RODS WHEN RELOADING A NUCLEAR REACTOR

BACKGROUND OF THE INVENTION

The invention concerns a method of handling fuel assemblies and rods in the reloading with fuel of a nuclear reactor containing assemblies with a framework closed by two caps inside which fuel rods are vertically disposed.

After a certain working period, fuel assemblies disposed in the vessel of the reactor exhibit some wear, i.e. a nuclear fissionable fuel material of these assemblies is depleted to some extent, so that it is necessary to change some of these fuel assemblies which have become unsuitable for later use in the core of the nuclear reactor for the production of heat. In addition, the cladding material of some fuel rods can exhibit cracks after these rods have been used for some time, so that leakages of fission products into the cooling fluid of the reactor, in contact with these fuel rods, are possible.

The core of the nuclear reactor is consequently reloaded with fuel at predetermined time intervals, during which used or defective fuel assemblies are removed and replaced.

In most nuclear reactors, the fuel elements constituted by rods containing fuel material inside a tubular cladding of cladding material are disposed inside assemblies in which these rods are placed parallel to each other, in the axial direction of the core, i.e., generally in the vertical direction. Each of the fuel-rod assemblies constitutes a rigid assembly having a framework or skeleton inside which the fuel rods are disposed. The framework of the assembly is constituted by support tubes and caps which can be designed to allow demounting and remounting of the assembly if the framework is required to be reused when the fuel element of the fuel rods is used up.

In the case of pressurized water nuclear reactors, the assemblies are disposed in the tank of the reactor and constitute its core. The assemblies are disposed in a lattice of square mesh, and some of these assemblies are equipped with a cluster of material absorbing the neutrons serving to control the reactor. During reloading of the reactor, the vessel of the nuclear reactor is open, and this vessel as well as the swimming pool around it is filled with water up to a certain level, allowing fuel rods to be moved between the reactor and the swimming pool, at a depth sufficient to assure the protection of the personnel carrying out the reloading operations.

These operations consist firstly in moving fuel assemblies from one region of the reactor core to another, this core being divided into three regions inside which each of the fuel assemblies lies between two reloading operations. The most used assemblies are to be found in the third region of the reactor and are removed via the swimming pool for the fuel adjoining the reactor and replaced by new assemblies.

When transferring assemblies from one position to another or replacing assemblies by new assemblies, it is necessary to carry out permutations of the control clusters, these clusters always staying in the same position in the core.

The reloading operations also consist in replacing fuel assemblies having rods exhibiting leakages by new assemblies.

Independently of the reloading operations, the used assemblies are removed after decay of their radio activity to reprocessing works, although a certain number of fuel rods inside these assemblies could be reutilized to reconstitute reloadable fuel assemblies in the nuclear reactor.

Similarly, part of the fuel rods of the assemblies removed from the core of the nuclear reactor because they contain fuel rods exhibiting leakages or geometric deformations can be recovered to reconstitute reloadable assemblies in the core of the reactor.

Methods of repairing fuel assemblies by replacing used fuel rods inside the assembly have also been proposed.

In these methods, however, repair of the assembly is carried out, independently of the reloading operation, with a tool allowing the defective fuel rods to be removed one by one and replaced by new rods.

Reloading is always carried out with whole assemblies, each used or defective assembly being replaced by a new or reconstituted assembly reconditioned in operations which are independent of the actual reloading operations. Known methods generally require reprocessing and storage of the whole of the assembly comprising both skeleton and fuel rods.

The methods used to date consequently tend to increase the consumption of fuel material by removing fuel rods which could continue to be used, and to increase the number of de-mounting and handling operations carried out on fuel assemblies to recondition them before loading into the core.

SUMMARY OF THE INVENTION

The object of the invention is therefore a method of handling fuel assemblies and rods upon reloading with fuel of a nuclear reactor containing assemblies having a framework closed by two caps inside which fuel rods are disposed vertically, reloading being carried out with the vessel of the reactor open and the swimming pool around the vessel filled with water, and comprising transfers of fuel assemblies from one position to another inside the reactor, replacement of defective or used assemblies, by suitable assemblies and various tests, each assembly replaced being taken from the vessel of the reactor, placed in a transfer container and conveyed in a horizontal position into the swimming-pool for the fuel adjoining the reactor, this method allowing the best reuse of the fuel rods not completely used up in assemblies being replaced and use, on unloading, of frameworks or skeletons of these assemblies.

To this end, the following operations are carried out in succession:
- the assembly is put in vertical position inverted relative to the position for service of this assembly in the core of the reactor, i.e., with its lower cap uppermost,
- the lower cap is de-mounted so that access can be had to the ends of the fuel rods,
- if necessary, the fuel rods to be replaced in the assembly are identified, if this identification has not been carried out in the reactor or in the swimming pool of the reactor,
- a set of rods to be replaced is taken up simultaneously,
- if necessary, the taking up of rods in sets is continued until all the rods to be replaced have been taken up,
- these sets of rods are deposited in a location for storing used rods, rods which are new or to be recycled corresponding exactly to the sets of rods to be replaced are taken up, these sets are deposited in the framework of the fuel assembly, the lower cap of the assembly is replaced and this assembly is conveyed into the vessel of the reactor in its new location.

BRIEF DESCRIPTION OF THE DRAWINGS

For a full understanding of the invention, an embodiment of various apparatuses allowing implementation of the method according to the invention during reloading of a pressurized water nuclear reactor will now be described with reference to the accompanying drawings in which:

FIG. 1 represents a vertical section of a front elevation of the whole of the reactor housing and of the attached housing containing the swimming pool for the fuel equipped with the apparatus according to the invention.

FIG. 2 represents an elevation of the rocker apparatus following the fuel assemblies to be presented in the vertical position inverted relative to the position for service in the swimming pool for the fuel.

FIG. 3 represents an elevation of the handling machine taking up the fuel rods of the assemblies in the swimming pool for the fuel.

FIG. 4 represents a section at A—A of FIG. 3.

FIG. 5 represents a vertical section of the mast for gripping assemblies and removing the lower plate associated with the handling machine represented in FIGS. 3 and 4.

FIG. 6 represents a vertical section of, one of the rod-gripping masts of the handling machine represented in FIGS. 3 and 4 allowing taking up of the fuel rods in the swimming pool for the fuel.

FIG. 7 represents an elevation with partial section of the gripping system for rods disposed at the end of the gripping mast in position above an assembly.

DESCRIPTION OF AN EMBODIMENT

Figure 8:
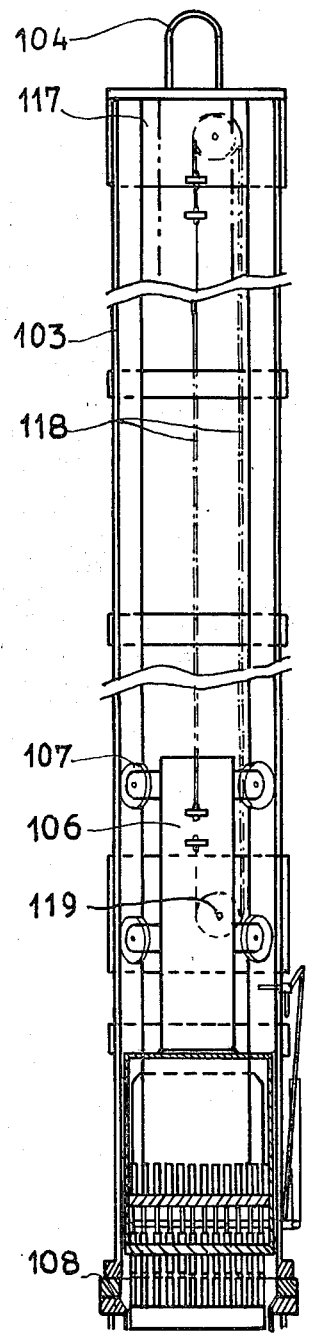
FIG. 8 represents a section of the handling tool for new fuel rods.

In FIG. 1, there can be seen the part of the reactor housing closed by the sealed casing 1 in communication with the housing 2 of the fuel separated from the reactor housing by the sealed casing 1 and by a double casing 4. The reactor housing contains the vessel 3 of the reactor resting on the concrete well 5. The vessel 3 of the reactor contains the core 6 inside which the assemblies 7 are disposed parallel to each other in a regular lattice.

The vessel 3 is surrounded by the swimming pool 8 which, on reloading of the reactor, is filled with water up to the level 9, this water also filling the vessel 3 which is open on reloading.

Reloading is carried out at the vessel by a reactor-loading machine 10 movable above the upper level of the swimming pool on rails 11 extending over the whole length of the swimming pool.

The loading machine 10 comprises at least one loading mast 12 allowing taking up of the assemblies 7 in the vessel of the reactor and their conveying inside the swimming pool 8 under the water of this swimming pool at a depth which prevents the risk of irradiation of personnel carrying out reloading. A machine for carrying out permutation of clusters 14 of absorbent material is also disposed in a fixed position in this swimming pool to change clusters of absorbent material associated with some of the fuel assemblies involved in transfers carried out in the core.

Instead of a machine with a single loading mast 12 as represented in FIG. 1, a loading machine with three masts can be used. This assures which ensures not only the taking up of the assembly but also the permutations of the clusters and plugs associated with the assemblies when permutations in position of the assemblies in the core are carried out. In this case, there is clearly no advantage in having a machine for permutation of the clusters, such as the machine 14 in the swimming pool of the reactor.

A rocker 15 is also disposed in this swimming pool 8, alongside the fuel housing, allowing vertical or horizontal positioning of a container 16 mounted articulated on a conveyor 17 allowing the container to be moved between the swimming pool 8 of the reactor and the swimming pool 18 for the fuel disposed inside the fuel housing 2.

To move from the swimming pool of the reactor to the swimming pool for the fuel and back, the conveyor 17 and the container 16 connected to it pass inside a transfer pipe 20 closable at the end facing the swimming pool of the reactor and horizontally disposed.

When the container 16 is vertically disposed with the aid of the rocker 15, inside the swimming pool of the reactor, it is possible to put an assembly 7 inside this container with the aid of the loading machine 10 which moves into position 10'.

The rocker also allows the container to be returned to the horizontal position on the conveyor 17 and the conveyor and the container in this position can pass inside the pipe 20 to transfer the container and the assembly which is disposed inside into the swimming pool for the fuel.

The set of apparatuses located inside the swimming pool of the reactor which has just been described forms part of the state of the known art, the loading operations carried out currently in nuclear power stations making use of such apparatuses which are well-known to users of nuclear power stations.

The conveyor 17 also allows the container to be brought inside the swimming pool 18 for the fuel at the level of a new type of rocker 21 which allows the container with an assembly therein to be put in one or two vertical positions, in which the assembly is in its normal position or conversely in the position inverted relative to that which it occupies in the core reactor, i.e., with its lower cap uppermost.

The rocker 21 will be described in more detail with reference to FIG. 2.

The swimming pool for the fuel can include, in a manner known per se, one or several chutes such as 23 which allow a fuel assembly, for example a new assembly brought by the rolling bridge 24, to be placed at the bottom of the swimming pool in a vertical position.

The swimming pool for the fuel presents several parts such as 18a, 18b, 18c separated by dams such as 19a and 19b.

Thanks to these dams, the handling means of the swimming pool for the fuel allows fuel assemblies or rods to be conveyed from one to the other of these regions of the swimming pool for the fuel.

Various tracks such as 26 for moving the machines for handling fuel elements are disposed above swimming pool 18.

In particular, a machine 30 for handling rods which will be described in more detail with reference to FIGS. 4 to 8 can move above the swimming pool for the fuel to handle rods.

Figure 10:
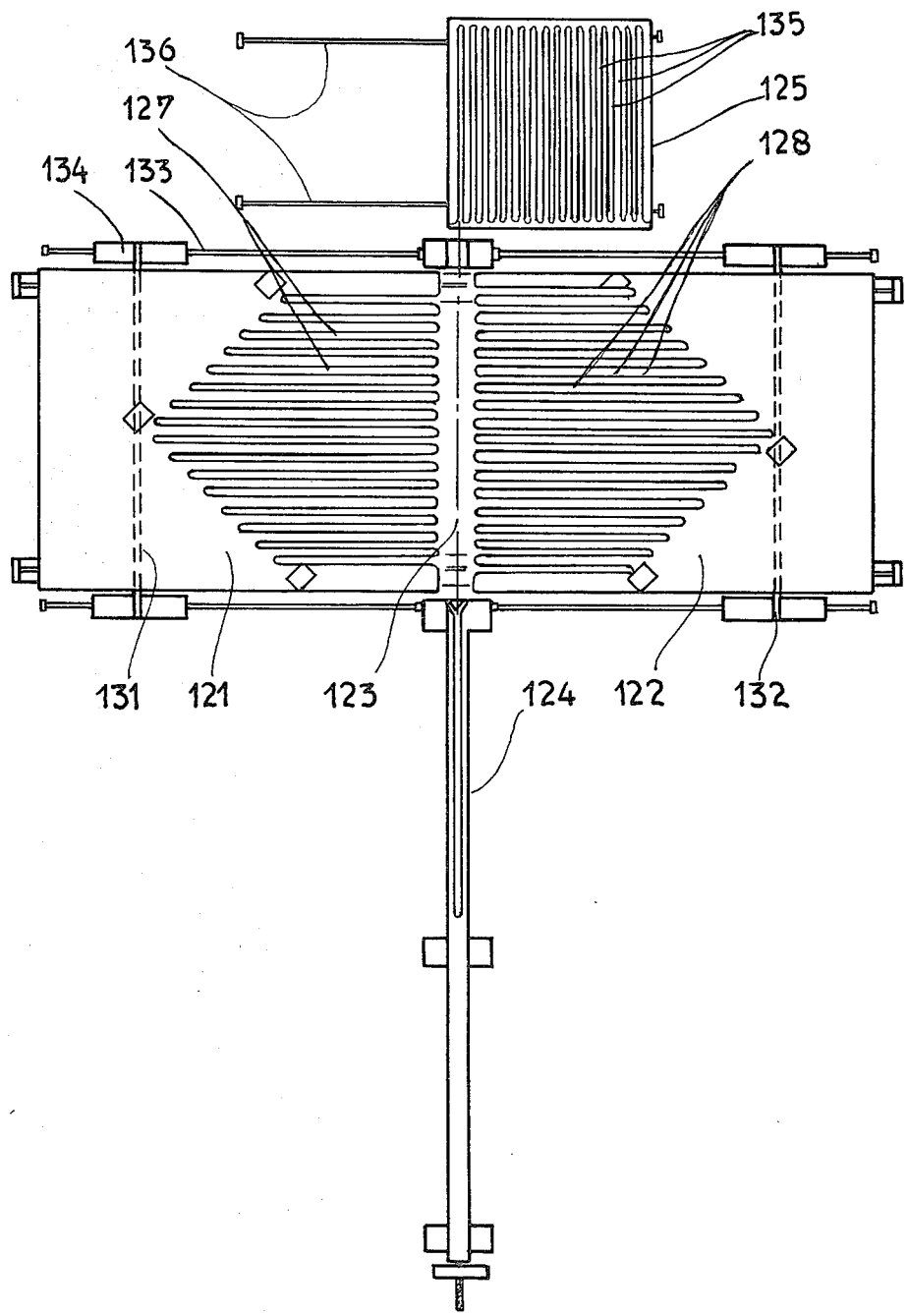
FIG. 10 represents a system for storing used or defective fuel rods.

The region for storing the used fuel of the swimming pool 18 also includes a unit 31 for storing used or defective fuel rods which will be described in more detail with reference to FIG. 10.

Finally, in the region beyond the swimming pool for the fuel, i.e., in a region outside the water, a manual tool 32 for handling new fuel rods can move. This tool, which will be described in more detail with reference to FIGS. 8 and 9, allows new fuel rods to allows new fuel rods to be conveyed to a framework at the bottom of the swimming pool for fuel by a chute whose loading is completed with the aid of the tool 32, each time a set of rods is taken from this framework to re-equip a fuel assembly from the core of the reactor.

Reference will now be made to FIG. 2 in order to describe the rocker apparatus 21 allowing the container 16 and the fuel assembly inside it to be put into the swimming pool for the fuel in a vertical position.

The conveyor 17 includes two beams such as 17a separated by a distance slightly greater than the diameter of the container 16 with an assembly inside it, this container including two connection pieces such as 35 which can engage two pivots such as 36 solid with the beams 17a and 17b of the conveyor, respectively.

In this way, the container 16 can be connected to the conveyor 17 for rotary movements with respect to the conveyor about the pivots 36.

The connection pieces 35 also allow the container of the conveyor to be disengaged.

The rocker 21 comprises a chassis 39 fixed at the bottom of the swimming pool for the fuel to which is fixed in the direction of the conveyor 17 an endless screw 40 which can be driven in rotation about its axis in the framework by a rod 41 driven by a crank disposed in the upper part of the rocker above the level of the swimming pool.

This endless screw is in engagement with a yoke 42 for lifting the container, by movement of this lifting yoke between a position 42a and a position 42b.

The position 42a of the yoke allows the container 16 to be put in a vertical position so that the assembly which is disposed inside the container is in the position it occupies in the core of the reactor, i.e., with its upper cap in the high position.

The position 42b, termed position for taking up rods, allows the container 16 to be swung with the assembly contained therein into a vertical position such that the assembly is in the inverted position relative to the one it occupies in the core of the reactor, i.e., it is then disposed with its lower cap uppermost.

The assemblies are in fact designed so that the lower cap can be easily removed, while the upper cap has members which it is best not to remove. To gain access to the rods, it is therefor preferable to remove the lower cap of the assembly. In the two positions 42a and 42b, the lifting yoke is engaged on the container 16 so that the latter can be driven in rotation about the axis 35 by traction on the lifting yoke 42 in one of its positions 42a and 42b by means of a traction cable 43 driven by a winch 44.

The winch 44 is itself movable on an endless screw 45 which allows it to be moved between a position 44a and a position 44b corresponding respectively to the position 42a and the position 42b of the lifting yoke, by means of a crank and a control rod.

The unit for driving and guiding the winch 44a can be moved aside to allow access to the container and to the assembly in vertical position of the machine 30 for handling rods.

When traction is effected on the cable 43 by means of the winch 44 in one of its positions 44a and 44b, the lifting yoke 42, the container and the assembly are driven in a rotary movement about the axis 36 until the container and the assembly are in the normal vertical position 16m or in the inverted vertical position 16i, the lifting yoke then coming into position 42m or 42i.

As the apparatus 45 for moving the winch 44 is in retracted position, it is possible to bring one of the masts 47 of the machine 30 for handling fuel rods over the container and the assembly in normal position or in inverted position.

A general view in elevation of the machine 30 for handling the fuel is shown in FIG. 3 while FIG. 4 shows a view in section of this machine in which the position of the gripping masts and the detection apparatus is clear.

The machine for handling the fuel has a chassis 50 provided with wheels 51 moving on the rails 26 above the swimming pool for the fuel.

This handling machine also has a cylinder 52 bearing three masts which can be positioned by rotation successively above an assembly disposed at the bottom of the swimming pool for the fuel.

As shown in FIGS. 4 and 5, the machine for handling rods has three fixed masts 53, 54 and 55 and a detector apparatus 56 vertically movable along a mast 57 bearing a camera for viewing the handling of the rods.

The mast 53 allows gripping of the assembly and removal of the lower cap of this assembly when it is inverted vertical position.

The masts 54 and 55 allow gripping of the whole of the rods of an assembly, the mast 54 allowing gripping of a sub-assembly comprising half the rods and the mast 55 gripping of the other sub-assembly.

FIG. 5 shows the end of the mast 53 allowing approach to and gripping of the assembly 7 disposed inside the container 16 under the mast 53 in inverted vertical position and removal of its lower cap.

The fixed mast 53 of the machine 30 for handling the fuel rods has an assembly of rollers 60 for guiding the telescopic shaft 61 bearing the tooling allowing taking up of and approach to the assembly and unscrewing of the lower cap 64 connected to the support tubes 65 of this assembly by screws.

At its upper part the container 16 includes centering fingers 66 on which the base plate 67 of the tool 68 for lifting the assembly is centered.

This tool is constituted by a grab having gripping fingers 69 maneuverable by rods 70 connected to pneumatic actuators 71 for opening and closing the fingers, allowing the assembly to be seized by its cap, in particular by its upper cap, when the assembly is in normal position.

The tool 68 also includes a device 72 for locking the fingers which is movable by means of a spring 73, unlocking being possible only when the assembly rests at its lower part on a support and when the grab 68 is able to move vertically and downwards with respect to the assembly.

Taking up by the upper cap of the assembly in normal position is necessary for complete removal of the elements from the core of the reactor.

A tooling allowing unscrewing of the lower cap 64 of the assembly 7 is also disposed in the center of the grab 68, the lower part of the grab having centering pins 74 which engage in the lower cap 64 so as to position the unscrewing tool above the lower cap of the assembly in a precisely centered position.

When the unscrewing tooling is in position on the lower plate of the assembly, an assembly of turnscrews 75 mounted on a plate 76 will be in position on each of the connecting screws of the lower cap of the assemblies and the support tubes 65.

The plate 76 bearing the turnscrews is guided into the tool 68 and can be moved in the vertical direction by means of an actuator 77.

The turnscrews 75 are mounted to rotate on the plate 76 and can be actuated to unscrew or to screw on the lower plate of the assembly by rods 78 solid with a plate 79 with a threading of very large pitch engaged inside the rods of the turnscrews, which have a screw-threaded bore corresponding to the threading of the rods 78.

Maneuvering of the turnscrews can be effected by an actuator 80 causing traction on the plate 79.

The machine for handling rods also includes a detector-bearing carrier 56 vertically movable on the mast 57, this detector-bearing carrier being congrous in section which the square section of the assembly, so that a centering apparatus can allow the base of the detector bearer to be precisely centered on the assembly when the lower plate has been removed by means of the tooling disposed in the mast 53.

To achieve this, the cylinder 52 of the handling machine simply has to be turned to bring the detector-bearing carrier vertically above the assembly, and this detector-bearing carrier is then lowered by means of a winch to the level of the assembly.

When the detector bearer is exactly centered on the assembly, the detectors are each in position against the end of a rod so that each of these detectors can determine whether the rod with which it is in contact can be retained in the assembly or must be removed.

Detectors, for example ultrasonic ones, are in fact known which allows cracks to be detected in the cladding of a fuel rod, these cracks making the rod unfit to be re-used in the assembly.

Detectors are also known which are capable of determining the depletion ratio of the fuel in the rod with which they are in contact.

The detector apparatus is connected to means allowing recording of the position of the fuel rods to be retained and those to be replaced in the assembly.

The tool for gripping the rods disposed inside the mast 54 (or 55) of the handling machine 30 is shown in FIGS. 6 and 7.

The fixed mast 54 has guiding rollers 81 to guide, in the vertical direction, a telescopic mast 82 of square section which is movable inside the fixed mast 54 by means of a winch apparatus. This telescopic mast has guiding rollers 83 which allow guiding and movement inside the telescopic mast of a gripping tool 84 whose end with gripping tongs is represented on a larger scale in FIG. 7.

The tool 84 is of square section and has dimensions similar to those of the assembly.

The telescopic mast 82 bears combs for guiding the fuel rods 85 and 86 articulated on the telescopic mast 82 so as to be placeable in working position (comb 85) or in non-working position (comb 86) by means of apparatuses with cams and small rods 87 and 88 controlled by the movement of the handling tool 84 inside the telescopic mast 82.

The combs 85 and 86 are retracted at the passing of the tool 84 and are returned to position to guide the rods after the passing of the tool 84. The telescopic mast 82 has centering pins 91 at its base which are positioned in recesses at the upper part of the container 16 in order to center the tool for handling the rods above the assembly 7.

When the telescopic mast is in place on the container in centered position, the handling tool 84 is lowered until the central rods 92 of the tongs 93 fixed on the plate 90 solid with the base of the tool 84 come into contact with the plugs 95 of the fuel rods 96 of the assembly 7. The tongs assembly 93 is then in opening position and a mounting which is flexible thanks to springs 98 allows compensation for small displacements in the position of the plugs of the rods of the assembly in the vertical direction.

The handling tool also includes a plate 99 on which pneumatic actuators 100 are mounted whose rod is connected to sleeves 101 which come to engage on the outer part of the tongs so as to close them when the corresponding actuator 100 is actuated downwards.

The handling apparatuses associated with the masts 54 and 55 of the machine 30 are identical, except that one of the toolings associated with one of the masts acts on a first assembly of fuel rods comprising 132 fuel rods in the case of fuel assemblies with 264 rods used in pressurized water nuclear reactors, while the tooling associated with the other mast of the gripping machine acts on the other 132 fuel rods.

It is not in fact possible to seize simultaneously all of the rods disposed in the assembly in a square-meshed structure, because the spaces between the different plugs of the fuel rods are not sufficient for the tongs to be inserted thereinto.

It is therefore necessary to operate in two stages, one being carried out by the tool associated with one of the masts and the other by the tool associated with the other mast.

The tool associated with the first mast is capable of taking up the rods disposed on the diagonals of the assembly disposed in a first direction, by taking up only every other diagonal, in while the other tooling is capable of taking up the rods disposed on the diagonals in the other direction, also by passing over every other diagonal.

The two toolings are therefore jointly capable of taking up all the rods of the assembly.

The combs for guiding the rods will therefore be arranged with their spaces in the directions of the diagonals concerned.

Figure 9:
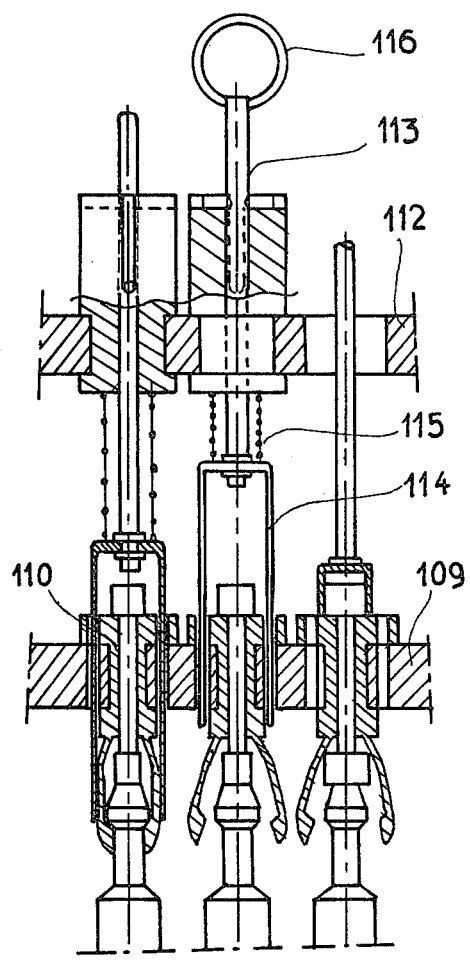
FIG. 9 represents the end of the handling tool for new fuel rods with gripping tongs in a view in vertical section.

With reference to FIGS. 8 and 9, the tool 32 for handling new rods which operates in the region of the housing of the fuel outside the swimming pool is seen to include a body 103 whose upper part bears a handle 104 which is necessary for connecting the tool for handling new rods to a handling bridge 105 (shown in FIG. 1). A tong-bearing tool 106 is guided by rollers 107 inside the body 103 of the tool so that it moves in the vertical direction inside this body 103.

At its base, the tool has a positioning foot 108 with two positions, each of these positions corresponding to the take-up position in a rack for storing new rods, in which the rods are arranged as in an assembly, in two sub-assemblies arranged one diagonal out of two in the assembly.

When the handling tool is in one of these two positions, the tongs 110 mounted on a plate 109 are in contact at their lower part with the plugs of the new fuel rods disposed in the storage rack.

The tool also includes a transverse plate 112 on which are mounted sliders 113, on the ends of which are fixed sleeves 114 which, in their low position, can come to engage on the tongs so as to close them on the plugs of the fuel rods.

The sleeves are pushed downwards by springs 115 which keep them in the closed-tongs position.

When the tooling is brought to the storage rack for new rods, the tongs are kept open by means of a pin which prevents movement downwards of the slider 113 solid with the sleeve 114. To cause the tongs to close on the plugs of the selected fuel rods, the pin is simply unlocked by effecting a quarter turn of the sleeve while grasping it by the ring 116.

When the ring 116 is released, the spring 115 brings the sleeve into the closed-tongs position.

The tongs assembly corresponding to the assembly of rods required to be extracted being closed, the gripping tool inside the body 103 is simply lifted by means of a crank acting on a pulley 117 driving the gripping tool by means of a cable 118 and an opposing pulley 119.

The whole of the system for storing used or defective rods taken from the assembly will now be described with reference to FIG. 10.

This apparatus 31 is composed of two combs 121 and 122 with a space 123 between them in which a rod pusher 124 can move towards a removal container 125 having recesses for disposing fuel rods against each other.

Each of the combs 121 and 122 includes a set of recesses for rods brought into vertical position above the combs 127 and 128.

A stop is associated with each of the combs 121 and 122 allowing the rods to be advanced up to the space 123 between the two combs.

A stop 131 is associated with the comb 121 and a stop 132 is associated with the comb 122. Each of the stops 131 and 132 is mounted on two carriers with rollers, movable in the longitudinal direction of rod recesses in the combs by means of endless screws such as 133 driving the carrier 134 of the stop 131.

The container 125 includes recesses 135 perpendicular to the recesses of combs 121 and 122 for collecting a whole row of fuel rods pressed one against the other originating from the space 123 between the tools and pushed by the pusher 124.

The removal container 125 is mounted on wheels allowing it to move on the rails 136.

The container 125 can advance in the longitudinal direction of the combs so as to present each of its recesses 135 opposite the space 123 for filling with used or defective fuel rods.

The fuel rods are kept together inside the recesses of the combs and the removal container by springs allowing holding of the rods and their removal by pressure.

An operation will now be described which is carried out on an assembly removed by the loading machine of the reactor from the core 6 of this reactor at a region in which, in loading procedures as practised to date, assemblies are replaced by new assemblies.

The removed assembly is brought by the loading machine 10 into the container 16 which is placed in the vertical position by means of the rocker 15, which returns the container to the horizontal position when the assembly has been deposited.

The conveyor 17 is then pulled to the swimming pool for the fuel 18a and the container is brought into position on the rocker 21 disposed at the bottom of the swimming pool for the fuel.

To position it on the rocker 21, the end of the container comes to abut on one projecting end of the lifting yoke 42 and movement of the conveyor 17 is then stopped.

The lifting yoke 42 is then put in its position 42b so as to put the assembly inside the container 16 into inverted vertical position.

During rotation of the container, the cap of this container, kept closed by contact of the end of the container with one rail occupying the lower part of the rocker, and semi-circular in shape, has been opened under the effect of springs pushing this cap when contact between the cap and the guiding rail is no longer assured.

When the container is in inverted vertical position, the assembly is accessible from the top, and the apparatus for moving the winch for lifting the container is then retracted, enabling bringing up by the top of the rocker of the machine for handling the rods whose mast 53 is positioned vertically above the container.

After centering of the tool for removing the lower plate of the fuel assembly on this assembly, the plate is unscrewed and taken up by the grab.

All that is then required is to turn the cylinder 52 of the machine for handling the rods so as to bring the detector-bearing carrier vertically above the open assembly and to lower and center the detector bearer on the assembly so as to effect the detection and location of rods to be replaced in the assembly, either because of wear or because of faults prohibiting their retention in the assembly.

This detection and location can also be carried out in the swimming pool of the reactor or in the reactor independently of the operations in the swimming pool for the fuel.

Data concerning the rods to be replaced supplied by the detectors are used both to program the operation of the tongs of the tools for gripping used rods in the assembly, and also to determine reloading with new rods taken from the storage racks of new rods to re-equip a storage assembly of new rods disposed in the swimming pool and positioned in the chute of the swimming pool.

All that is then required is to turn the cylinder of the machine for handling fuel rods so as to bring one of the two masts 54 or 55 vertically above the container containing the assembly taken from the core of the reactor and whose lower end is removed.

One of the two masts is then used to remove all the fuel rods to be replaced contained in the sub-assembly which is accessible with the aid of this gripping mast, by means of the tongs assembly whose closing has been programmed as a function of the data supplied by the detectors.

The first assembly of rods is then raised inside the mast of the machine for handling the rods, and the second removal, corresponding to the second subassembly, is carried out with the aid of the mast 55 brought into position above the assembly. The whole of the machine 30 for handling the fuel is then brought above the system for storing the used rods to dispose the removed rods in the two combs of this storage system.

The machine is then brought above a framework completely filled with new rods disposed with its fuel rods accessible from above in a chute or in a storage recess at any location in the swimming pool for the fuel.

The masts used for removing the used rods are then used to remove the exactly identical assemblies of new or recycled rods and convey them to the assembly disposed in the container, into which these new or recycled rods are inserted in place of the used rods removed by the machine.

During these operations carried out with the handling machine, the manual tool for handling new rods is used to re-equip the assembly for storing new rods with assemblies of rods exactly identical to the assemblies of new rods which have been removed by the handling machine to replenish the assembly disposed in the conveying container. To do this, this assembly for storing new rods is brought to the upper part of the chute, i.e., to the upper level of the swimming pool, so that the manual tool can deposit its load of new rods there.

Thus the framework containing the new rods remaining permanently in the chute is constantly filled with rods, since removal by the machine for handling the rods is immediately followed by replenishment with the aid of the manual tool for conveying the new rods. In the case of recycling partially used rods, a second framework in fixed position placed in a rack for storing used fuel is used and equipped with rods to be recycled by a manual tool similar in design to that for new rods.

When the assembly from the core of the reactor which was placed in the conveying container has been entirely re-equipped, the tool associated with the mast 53 of the handling machine is used to screw the lower cap of the assembly back on again. Swinging of the container and the assembly into the horizontal position can then be effected so that the carrier can return this assembly onto the rocker 15 of the swimming pool for the reactor.

Return to the vertical position of the container with the aid of the rocker 15 allows the assembly to be removed with the aid of the machine 10 for loading the reactor. This machine is then brought to the level of the machine for permutation of the clusters and the assembly is re-equipped with the control cluster, necessary for the new location in which the assembly will be replaced. The assembly is then put back in its new location in the core of the reactor.

It can therefore be seen that the principal advantages of the invention are that it allows re-equipping of an assembly like that removed from the core of the reactor, while retaining the fuel rods of this assembly which are neither defective nor completely used up, and while keeping the framework of this assembly, making it unnecessary to handle and transport it to the swimming pool for used fuel and then to a reprocessing plant.

All the handling carried out in the swimming pool for the used fuel involves the rods only. This avoids the handling of extremely heavy assemblies and allows the best re-use of rods which can be used again. The fact that the frameworks of the assemblies and some of the rods are retained allows reprocessing time to be gained and lessens the area necessary for storing irradiated materials before and after reprocessing.

The method according to the invention therefore allows both economies in fuel material since greater depletion of fissile material is obtained, and economies in handling, conveying and storing operations carried out on the fuel assemblies.

The invention is not limited to the embodiment just described, but also includes various modifications.

Thus, in the example described, the fuel assembly remains in the conveying container on the rocker during all the rod-changing operations carried out in the swimming pool for the fuel, but it is possible to put this assembly in another device, for example a chute or any storage region within the swimming pool for the fuel.

The exemplifying embodiment described by way of example is used as used with a pressurized water reactor, but it is also possible to use the method according to the invention for other types of reactor, provided that their fuel elements are in the form of assemblies of parallel rods disposed vertically in the reactor, with the possibility of access to the rods by de-mounting of one of the plates of the assembly.

Testing of the rods of the assembly before partially changing them can be effected with detectors of any type, provided that these detectors allow detection of cracks in the cladding material, depletion of the fuel or geometric deformations. Testing and identification of the rods can also be carried out in the swimming pool of the reactor or in the reactor itself.

I claim:

1. Method of handling fuel assemblies and rods in the reloading with fuel of a nuclear reactor containing assemblies closed by two caps and having a framework inside which fuel rods are disposed vertically, the reloading being effected with the vessel of said reactor in open position and the swimming pool surrounding said vessel filled with water, and comprising transfers of fuel assemblies from one position to another inside the core of said reactor, replacement of unsuitable assemblies by suitable assemblies, and various tests, each replaced assembly being taken from the vessel of said reactor, placed in a transfer container and conveyed, in horizontal position, into the swimming pool for the fuel adjoining the reactor, said method comprising the steps of (a) placing said assembly in a vertical position inverted relative its operative position in the core of the reactor, i.e., with its lower cap uppermost;

(b) de-mounting said lower cap so that access can be had to the ends of said fuel rods;

(c) identifying fuel rods requiring replacement in said assembly if such identification has not been carried out previously;

(d) simultaneously taking up a set of rods to be replaced;

(e) continuing the taking up of rods in sets until all the rods to be replaced have been taken up;

(f) depositing said sets of rods in a storage area;

(g) taking up replacement rods corresponding precisely to the sets of rods to be replaced;

(h) depositing said replacement rods in sets in the framework of said fuel assembly;

(i) replacing the lower cap of said assembly; and (j) conveying said assembly into said reactor vessel at its new location.

2. Apparatus for handling fuel assemblies and rods in the reloading with fuel of a nuclear reactor comprising, inside the housing for the fuel adjoining the housing of said reactor (a) an assembly rocker for placing a said assembly in inverted vertical position;
(b) means for handling fuel rods movable above the swimming pool for said fuel, for removing fuel rods to be replaced from said assembly and re-equipping said assembly with replacement fuel;
(c) means for de-mounting the caps of said assembly,
(d) means for storing and removing replaced fuel rods;
(e) means for storing new rods; and
(f) means for handling new rods.

3. Apparatus according to claim 2, wherein said assembly rocker comprises a framework resting on the bottom of said swimming pool for the fuel; an endless screw arranged for pivotal movement within said framework, said screw being disposed horizontally in engagement with a drive part of a yoke movable between two positions corresponding to each of the ends of said screw, said yoke in each of said positions being in engagement with a container of said fuel assembly when the latter is in its horizontal arrival position in said swimming pool for the fuel for selectively placing into normal and inverted vertical positions the said assembly inside its said container, the latter being movably mounted for rotation at its central part on a conveyor for moving said container between the reactor housing and the housing for said fuel, rotation of said container being effected winch means by exertion traction on said yoke in engagement with said container at one of its ends.

4. Apparatus according to claim 2, wherein said means for handling fuel rods comprises three vertical masts mounted on a cylinder allowing them to come successively into position above said assembly, one of said masts having means for guiding and moving vertically a tool for handling assemblies and for de-mounting caps, the two other masts each having means for guiding and moving vertically a handling tool having a set of tongs arranged in a structure corresponding to the fuel rod structure in said assembly, the set of said two handling tools being adapted for grasping a said set of fuel rods of an assembly, when said two tools are successively placed in position above said assembly.

5. Apparatus according to claim 4, comprising bars disposed inside said masts allowing handling of the fuel rods, for guiding the fuel rods during their extraction, said bars being mounted for rotational movement inside said masts so as to be retracted from the space for passage of said tool for handling said rods and to be placed into operating position upon extraction of said rods.

6. Apparatus according to claim 4 or 5 comprising a detector-bearer mounted on said means for handling fuel rods, for identifying rods to be replaced in said assembly.

7. Apparatus according to claim 2, wherein said means for storing replaced fuel rods comprise combs capable of receiving said fuel rods in vertical position and associated with movable stops for moving rods along said combs and forming rows of rods in a space where a rod pusher moves, and a recessed container for storing and removing fuel rods, each of which takes a row of rods, said container being movable so as to bring its recesses successively into the extension of the space where said rows of rods are formed under the action of said movable stops, said rods being introduced into said container by said rod pusher acting on a said row of fuel rods.

8. Apparatus according to claim 2, wherein said means for handling new rods comprises a tool having a set of tongs arranged in a structure corresponding to the structure of a set of fuel rods in an assembly, said tool being suspended from a handling bridge so as to move in said fuel housing outside said swimming pool between a rack for storing replacement rods and a position vertically above an assembly chute in which there is disposed a framework for storing new rods, said tool for handling new rods allowing these rods to be seized from said rack and said assembly for storing new rods to be replenished with a set of rods corresponding to the complete set of fuel rods required by the assembly of new fuel rods.

* * * * *